United States Patent [19]
Petzold et al.

[11] Patent Number: 4,793,454
[45] Date of Patent: Dec. 27, 1988

[54] CONTINUOUSLY VARIABLE TRANSMISSION CLUTCH CONTROL SYSTEM

[75] Inventors: Werner P. Petzold, Harwood Heights; Alan L. Miller, Chicago, both of Ill.; William P. Umlauf, Schererville, Ind.

[73] Assignee: Borg-Warner Automotive, Inc., Troy, Mich.

[21] Appl. No.: 25,391

[22] Filed: Mar. 13, 1987

[51] Int. Cl.$^4$ .................. B60K 41/02; B60K 41/28
[52] U.S. Cl. ........................ 192/0.032; 192/0.052; 192/85 R; 192/103 R
[58] Field of Search ............... 192/0.032, 0.052, 85 R, 192/103 R

[56] References Cited

U.S. PATENT DOCUMENTS

| | | | |
|---|---|---|---|
| 3,115,049 | 12/1963 | Moan | 74/868 |
| 4,152,947 | 5/1979 | Van Deursen et al. | 474/11 |
| 4,458,318 | 7/1984 | Smit et al. | 474/12 X |
| 4,497,397 | 2/1985 | Windsor et al. | 192/0.052 X |
| 4,522,086 | 6/1985 | Haley | 74/867 |
| 4,638,898 | 1/1987 | Braun | 192/0.052 |
| 4,646,891 | 3/1987 | Braun | 192/0.032 |
| 4,648,496 | 3/1987 | Petzold et al. | 192/103 R X |
| 4,712,453 | 12/1987 | Haley | 74/866 |
| 4,718,308 | 1/1988 | Haley | 74/866 |

Primary Examiner—Allan D. Herrmann
Attorney, Agent, or Firm—James J. Jennings

[57] ABSTRACT

A clutch control system provides and regulates pressure at a clutch for transmitting torque from an engine to a drive train through a continuously variable transmission. A positive torque value is determined for each throttle setting and provided as a pressure input signal. Engine speed is monitored through a closed loop feedback system to provide an error signal to the desired pressure setting. A pressure control loop monitors pressure at the clutch through a closed loop feedback system to maintain the pressure at the clutch at a desired level. Filtering is provided in the torque and engine speed loops to provide for a more realistic response to driver demand. Incorporation of belt ratio factor in the engine speed control loop further provides for consistent and accurate response to driver demand variations at differing transmission drive levels. Overall line pressure within the associated hydraulic system further controls a proportional gain in the pressure control loop to provide appropriate response. Phase compensation and integral dynamic phase factors in the pressure control loop further guarantee a zero level steady state error signal and the generation of accurate control over the pressure control valve.

7 Claims, 13 Drawing Sheets

CONTINUOUSLY VARIABLE TRANSMISSION CLUTCH CONTROL SYSTEM

BACKGROUND OF THE INVENTION

The present invention generally relates to the torque or power transmission art. More specifically, the present invention relates to the operation and construction of continuously variable transmissions (CVT's). The present invention particularly provides a clutch control system and technique for regulating the transfer of torque from an engine to a drive train through a CVT and a control clutch.

The art contains numerous examples of the operation and construction of CVT's, e.g., U.S. Pat. No. 4,522,086 and U.S. Pat. No. 4,458,318, entitled Control System for Continuously Variable Transmission, and Control Arrangement for a Variable Pulley Transmission, respectively. These patents, especially the former, generally describe the mechanics and controls for a CVT system utilizing two adjustable pulleys, each pulley having at least one sheave which is actually fixed and another sheave which is actually movable relative to the first sheave. A flexible belt of metal or elastomeric material intercouples the pulleys. The interior faces of the pulley sheaves are beveled or chamfered. Thus, as the axially displaceable sheave moves relative to the fixed sheave, the distance between the sheaves and thus the effective pulley diameter may be adjusted. The displaceable sheave includes a fluid constraining chamber for receiving fluid to move the sheave and thus change the effective pulley diameter; as fluid is exhausted from the chamber, the pulley diameter changes in the opposite sense. Generally, the effective diameter of one pulley is adjusted in one direction as the effective diameter of the second pulley is varied in the opposite direction, thereby effecting a change in the drive ratio between the input shaft coupled to an input pulley and an output shaft coupled to an output pulley. The ratio changes continuously as the pulley diameters vary. Such transmissions frequently are referred to in the art as a continuously variable transmission, or CVT.

Through the years various refinements have gradually evolved the hydraulic control system which is used to pass fluid into the fluid holding chamber of each adjustable pulley. An example of such a hydraulic system is shown in U.S. Pat. No. 3,115,049—Moan. In that patent, control of the secondary pulley adjustable sheave regulates the belt tension, while a different circuit regulates fluid into and out of the primary sheave to regulate the transmission ratio. U.S. Pat. No. 4,152,947—van Deursen et al. also describes control of a CVT. In both systems, the line pressure of the fluid applied to hold the belt tension by pressurizing the secondary chamber is kept at a relatively high value. An improved control system subsequently was developed to reduce the mainline fluid pressures supplied to the secondary sheave chamber as a function of torque demand. This improved system is described and claimed in U.S. Pat. No. 4,522,086, entitled "Control System for Continuously Variable Transmission," issued June 11, 1985, assigned to the assignee of this application. Further work resulted in an improved control system which reduced the line pressure applied to the secondary chamber to a low, safe operating pressure and also provided a lower control pressure for other portions of a hydraulic control system. This system is described in an application titled "Hydraulic Control System for a Continuously Variable Transmission", Ser. No. 421,198, filed Sept. 22, 1982, which issued Dec. 15, 1987, as U.S. Pat. No. 4,712,453, and assigned to the assignee of this application.

Additional significant advances in CVT control systems have been described and claimed in another application also entitled "Hydraulic Control System for a Continuously Variable Transmission," Ser. No. 717,913, filed Mar. 29, 1985, which issued Jan. 12, 1988, as U.S. Pat. No. 4,718,308, and assigned to the assignee of this application.

Another U.S. Pat. No. 4,648,496, issued Mar. 10, 1987, entitled "Clutch Control System for a Continuously Variable Transmission" further describes control logic techniques for regulating pressure at a clutch in CVT system to provide the desired torque transfer from an engine to a vehicle drive line. In that system, clutch control depends on logical recognition of one of a number of operating modes.

This control system is designed to handle those situations where the total vehicle torque, interia torque plus road load, will load the engine down. These situations occur when the vehicle is stationary or at a slow speed. For the other situations, when the vehicle torque would accelerate the engine rather than load it down, this normal start mode would yield an undesirable response. These other situations are controlled as set forth in a copending application entitled "Special Start Technique for Continuously Variable Transmission Clutch Control", Ser. No. 25,476, filed on an even date therewith.

The teachings of each of the above referenced patents and applications are incorporated herein by reference in terms of background to the present invention, although practical problems may arise in the implementation of the previously envisioned systems.

BRIEF SUMMARY OF THE INVENTION

The principal object of the present invention lies in providing a continuously variable transmission clutch control system which generally overcomes the deficiencies of the prior art.

A further object may be found in improving the response of a continuously variable transmission driven vehicle to changes in driver demand while the clutch is being controlled.

Generally, the present invention provides an improved clutch control system for use with a continuously variable transmission driven vehicle. The improved controller controls engine speed as a function of driver demand (throttle) by applying a controlled clutch pressure throughout engagement to lock-up. Throttle signals provide engine torque and engine speed set points based on characteristics of the engine in use. Filters having preselected initial conditions modify the set points to approximate actual vehicle response characteristics and enhance driveability. The engine torque signal as derived from the engine map, provides a feed forward signal indicative of a desired clutch pressure for a particular driver demand. This signal combines with an engine speed error signal developed from the modified desired engine speed set point signal and the actual engine speed feedback signal. The system passes this signal for clutch pressure control only if it represents a pressure signal greater than the touch-off value for clutch operation. This is done to prevent the clutch from backing off of the touch off point. A pressure control loop maintains the clutch pressure at a level as indicated by the engine speed loop and the engine map derived torque feed forward and provides a signal with the appropriate duty cycle to an electro hydraulic clutch control valve.

The engine speed loop provides an enhanced response through the incorporation of the CVT belt ratio information into the speed control loop gain. All ratio conditions thereby provide improved response to change in driver demand and ratio.

The present invention further provides a pressure control signal additionally responsive to the variations in the overall line pressure. A signal representative of the line pressure provides the desired gain for the pressure loop control and thus maintains the desired response of the pressure loop as the line pressure varies.

Additional and further objects and advantages of the present invention will become apparent from the following detailed description and accompanying drawings.

BRIEF DESCRIPTION OF THE FIGURES

The novel features of the present invention are set forth with particularity in the appended claims. The invention, together with the objects and advantages thereof, may be understood more fully by reference to the following detailed description taken in conjunction with the accompanying drawings in which like reference numerals are used to indicate like elements and of which:

DETAILED DESCRIPTION OF A PREFERRED EMBODIMENT

Figure 1:
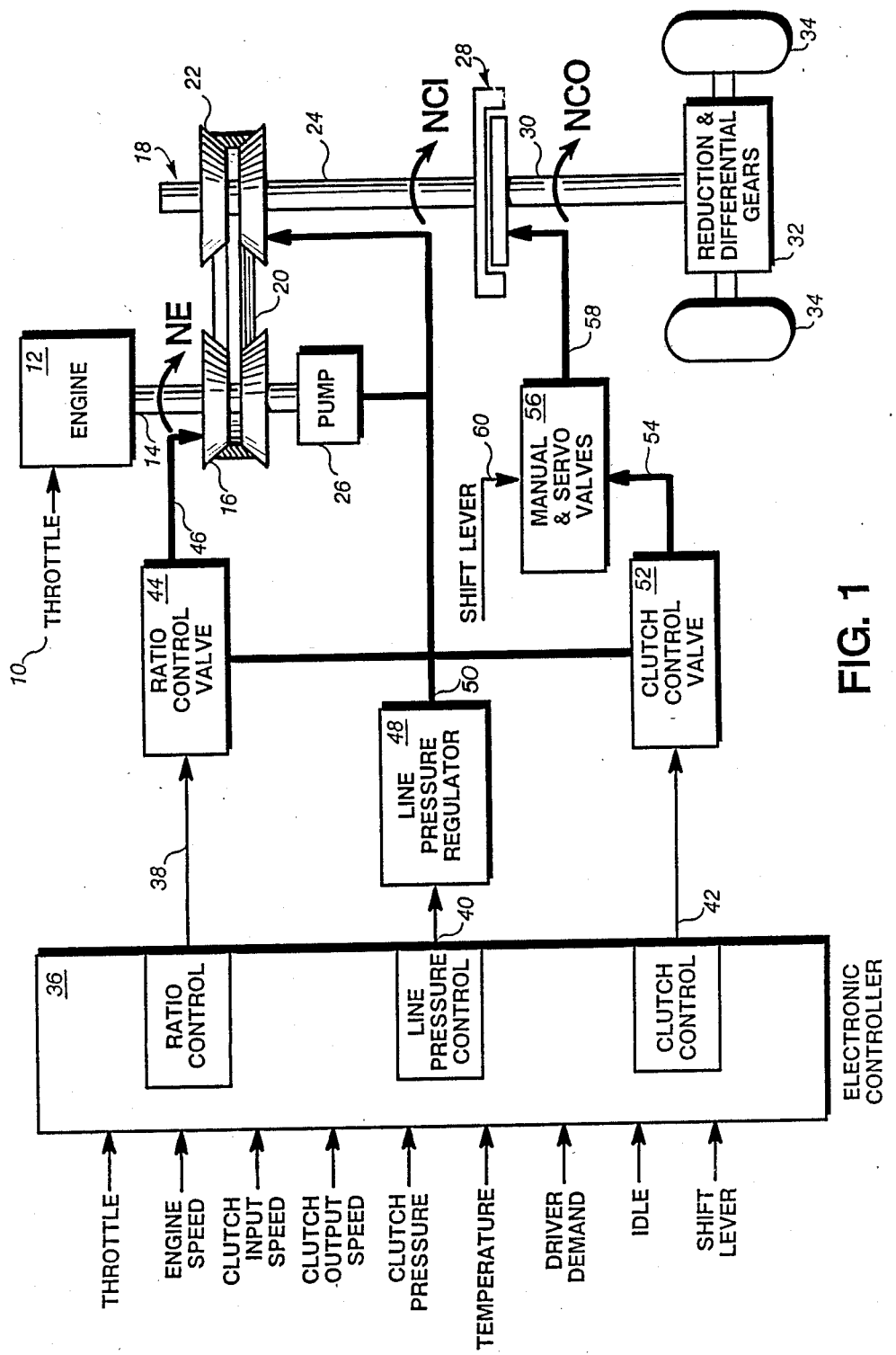
FIG. 1 is a block diagram representation of a CVT system utilizing the improved control system of the present invention.

As shown in FIG. 1, a throttle signal 10 controls the operation of an engine 12 which transmits torque via shaft 14 to a primary pulley 16 in a CVT 18. In a typical embodiment, a flywheel and damping arrangement may be included on shaft 14 between the engine 12 and the primary pulley 16. A metal or elastomeric belt 20 connects the primary pulley 16 to a secondary pulley 22 to transmit torque to a second shaft 24. A pump 26 may also be driven by the first shaft 14 to provide line pressure for the hydraulic system and the controls of the CVT 18.

The second shaft 24 drives the input to a clutch 28 which in turn provides a torque to a third shaft 30. The third shaft 30 drives a reduction differential gear arrangement 32 as a drive line to provide power to the vehicle wheels 34.

In operation, an electronic controller 36 receives throttle, engine speed, clutch input speed, clutch output speed, clutch pressure, temperature, driver demand, idle, shift lever and other information input signals as shown at the left of FIG. 1. The electronic controller 36 operates in a logical fashion discussed in greater detail below to provide a ratio control signal on a line 38, a line pressure control signal on a line 40 and a clutch control signal on a line 42. The signal on the line 38 to a ratio control valve 44 controls the hydraulic pressure on a line 46 to the primary pulley 16 of the CVT 18 to control the ratio between the primary pulley 16 and the secondary pulley 22, i.e., the belt ratio (RATC). The signal on the line 40 communicates with a line pressure regulator 48. The line pressure regulator 48 provides line pressure from fluid flow of pump 26 via conduit 50 to the ratio control valve 44, and to a clutch control valve 52. The output of the line pressure regulator on the line 50 also controls the pressure at the secondary pulley 22 to ensure that the below 20 does not slip. The output signal on the line 42 to the clutch control valve 52 controls the output of the clutch control valve 52 on a line 54 to the manual and servo valves 56 which controls the fluid flow on the line 58 to the clutch 28. This is the signal which provides the pressure at the clutch 28 and hence regulates the torque transfer from the second shaft 24 to the third shaft 30.

Ratio control valve 44 may be controlled in the preferred embodiment as set forth in a copending application entitled "Ratio Control Technique For A Continuously Variable Transmission System," Ser. No. 25,389, filed on an even data herewith.

A shift lever signal on a line 60 provides an additional control of the manual and servo values 56. When the shift lever signal on the line 60 indicates that the vehicle is in a neutral or park mode, the manual control within the valve arrangement 56 is closed. This prevents fluid from flowing to the clutch 28 and thus prevents any torque transfer through the clutch 28 when the vehicle is in the neutral mode.

A first arrow NE (N=speed; E=engine) on the first shaft 14 indicates one acceptable point of measurement for engine speed. A second arrow NCI (CI=clutch input) on the second shaft 24 indicates an acceptable point of measurement for the clutch input speed. A third arrow NCO (CO=clutch output) indicates an acceptable point of measurement for the clutch output speed, which corresponds to vehicle speed. These arrows are provided by way of example for pick-up points for the various speed measurements. Those skilled in the art will recognize that the various speed values may be accurately obtained at other locations. Any acceptable electromagnetic or other transducer may be used to monitor the shaft rotation speeds.

It should be appreciated that the ratio of NE to NCI will correspond to and provide a measure of the transmission belt ratio, RB. The difference between NCI and NCO provides a measure of the slippage at the clutch 28. When NCI equals NCO, the clutch 28 is locked-up with no slippage.

As mentioned above and explained in previous patents and applications, the system of FIG. 1 operates in a number of driving or vehicle operation modes. The main logic section determines which of these modes the system is operating in and accordingly provides appropriate information for clutch control. The overall logic flow for the clutch control is set forth in more detail in the flow charts of FIGS. 9A and 9B. The following represents a brief description of the modes of operation, and the general characteristics of the clutch during those modes:

OFF MODE: The clutch is destroked, i.e., the clutch plates are disengaged. A full-on duty cycle is sent to the clutch control valve, but flow to the clutch is blocked by the manual valve. This corresponds to the engine running while the vehicle is in PARK or NEUTRAL.

ENGAGE MODE: The system engages the clutch without transmitting any torque through the clutch. The pressure loop begins to control the clutch pressure to bring it up to the touch-off pressure set point. This corresponds to a transition between the OFF mode and a HOLD mode.

HOLD MODE: The clutch is at the touch-off point; the pressure loop maintains clutch pressure at the touch-off pressure. At this pressure, the plates are engaged and allow a small amount of vehicle creep which is adjustable by changing the value of PCE. This corresponds to the vehicle being at idle.

PRESSURE MODE: The clutch pressure set point is derived from sources other than the speed loop and related structures described herein (e.g., the special START mode application described in co-pending application Ser. No. 25,476, entitled "Special Start Technique For Continuously Variable Transmission Clutch Control," and assigned to the assignee of this application).

SPEED MODE: The SPEED loop and a feed-forward function determine the set point for the pressure controller. The clutch is slipping and controlling engine speed. This corresponds to a normal start for a vehicle transition from idle up to driving speed.

LOCK-UP MODE: The clutch is locked up and not slipping. A full-on duty cycle is sent to the control valve to maintain the pressure at the clutch to prevent slipping. This corresponds to a normal drive mode for a vehicle.

Figure 2:
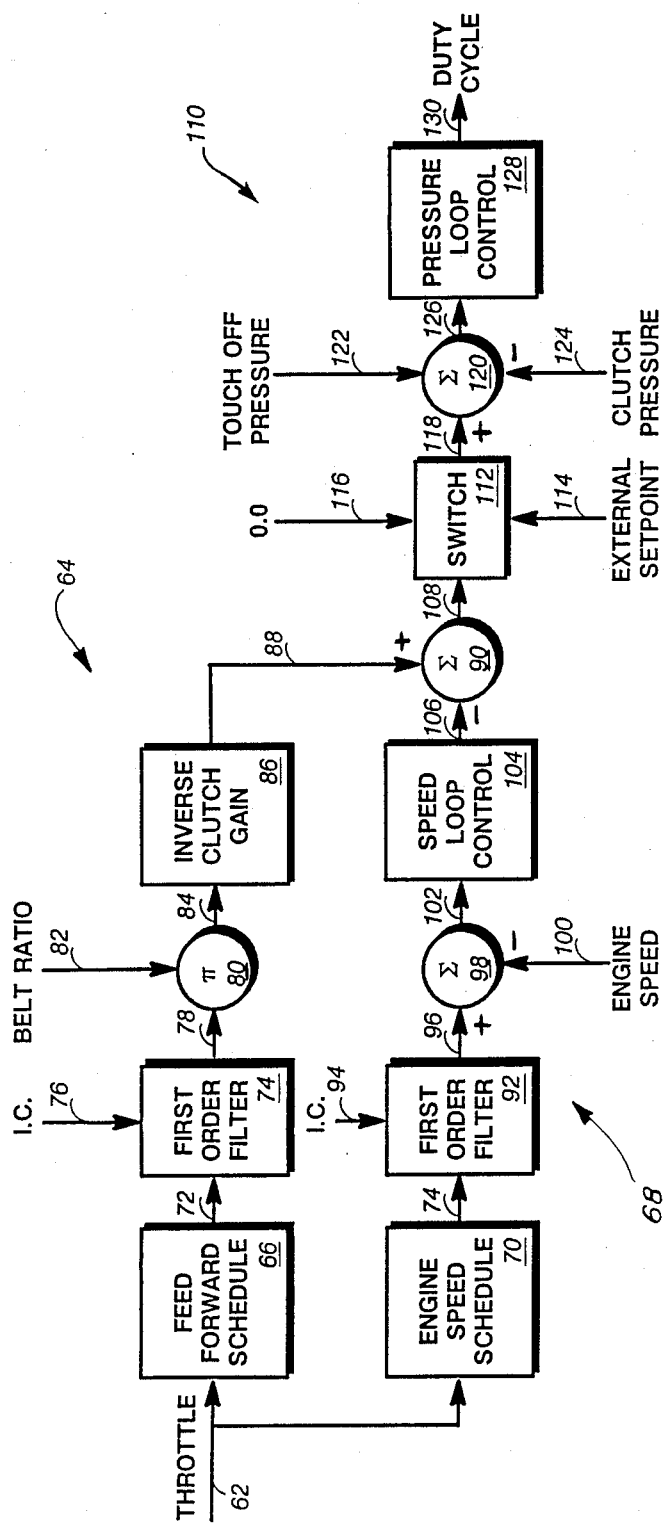
FIG. 2 is a block diagram representation, illustrating the feedback loops, of the improved clutch control of the present invention.

Referring now to FIG. 2, therein is shown a block diagram representation of the operation of the control system according to the present invention. Those skilled in the art will appreciate that this represents a block diagram system representation to be embodied through the programming of the electronic controller 36 illustrated in FIG. 1. Specific programming and instructions will depend upon the particular controller selected for use in the system and other variables not critical to the operation of the present invention. The explanation embodied in FIG. 2 and the flow charts discussed below provide the envisioned logical steps. It is deemed that one skilled in the art would be able to readily generate the program for the particular electronic controller to be used in any particular system.

In FIG. 2, a throttle signal on a line 62 represents driver demand for a particular engine function. The throttle signal may be in absolute terms or may represent the angular orientation of a throttle valve in a typical carburetor system. The throttle signal on the line 62 is provided to a feed forward open loop 64 at a feed forward schedule 66. The throttle signal on the line 62 also communicates with a closed loop engine speed control loop 68 and an engine speed schedule 70. The feed forward schedule 66 and the engine speed schedule 70 provide a torque feed forward set point on a line 72 and an engine speed set point on a line 74 according to the respective schedules derived from the particular engine in the vehicle as explained below in conjunction with FIGS. 3A–3C.

In the feed-forward open loop 64, the feed forward schedule 66 provides a torque set point on a line 72 to a first order filter 74. The first order filter 74, in conjunction with initial conditions received on a line 76, transforms the set point signal received on a line 72 to a filtered, modified torque signal on a line 78. Generally, the transfer function of the first order filter 74 may be given by the following equation:

$$TRQENF = \frac{1}{S/\omega f\!f + 1} TRQEN \qquad (1)$$

where: TRQENF is the signal on the line 78 and TRQEN represents the signal on the line 72.

The filter components may be selected to provide specific filter characteristics as defined by the following equations (2) and (3):

$$TRQENF(n) = XFFC(n) \qquad (2)$$

$$XFFC(n + 1) = -BFFC \left[ TRQEN(n) - XFFC(n) \right] + TRQEN(n) \qquad (3)$$

where: 'BFFC = exp $(-\omega f\!f \times Tss)$
Tss = sample period of speed loop
$\omega f\!f$ = cut off frequency of filter
n = cumulative number of sample periods
XFFC = filter state variable
TRQEN = output of feed forward schedule (Line 72)
TRQENF = Output of feed forward filter (line 78).

The operation of the filter further depends upon the initial condition signal received on the line 76. For the preferred embodiment of the present invention, the initial condition is chosen as zero as will be explained further below.

The filtered set point signal on the line 78 is passed to a multiplier 80 where it is multiplied by the belt ratio signal received on a line 82 to provide a clutch torque signal on a line 84 as given by the following equation (4):

$$TRQCN = RATC \times TRQENF \qquad (4)$$

where TRQCN represents the signal on the line 84 and, as mentioned, TRQENF represents the signal on the line 78.

The clutch torque signal on the line 84 may be converted to a clutch pressure signal by the following equation:

$$PCLUN = ATTCLU \times TRQCN \quad (5)$$

where:
TRQCN=engine torque at clutch (Line 84)
RATC=belt ratio (Line 82)
PCLUN=steady state clutch pressure set point (Line 88)
ATTCLU=inverse clutch gain. (Gain at block 86).
This operation is represented in FIG. 2 as block 86 to provide the steady state clutch pressure set point (PCLUN) on a line 88 to a summing junction 90. The other input to the summing junction 90 is received from the engine speed control loop 68.

As mentioned, the throttle signal from the line 62 proves an engine speed set point signal on the line 74 as a function of the engine speed schedule 70. A first order filter 92, in response to the engine speed set point on the line 74 and an initial condition on a line 94, provides a filtered set point signal on a line 96. The general transfer function for the filter 92 is given by the following equation (6):

$$NESPCF = \frac{1}{S(\omega SF) + 1} NESPC \quad (6)$$

where NESPCF is the output signal on a line 96 and NESPC represents the input signal on the line 74.

The specific characteristics of the filter 92 may be determined by the following equations (7) and (8):

$$NESPCF(n) = XSFC(n) \quad (7)$$

$$XSFC(n+1) = -BSFC[NESPC(n) - XSFC(n)] + NESPC(n) \quad (8)$$

where:
BSFC=exp [−ωsf×Tss]
ωsf=cutoff frequency for filter
Tss=sample period
NESPC=engine speed set point (Line 74)
XSFC=filter state variable.
NESPCF=output of setpoint filter (Line 96).

The filtered output signal on a line 96 then represents a modified version of the engine speed set point signal from the line 74 dependent upon the characteristics of the filter 92 and the initial condition received on the line 94. In the preferred embodiment, the initial condition is chosen to be a filtered value of the actual engine speed read into the controller just before entrance into normal start mode as discussed more fully below.

The output signal on line 96 provides one input to a summing junction 98. The other input to the summing junction 98 represents the actual engine speed from a line 100. This provides a first error signal on line 102. The signal on line 102 passes a speed loop control operation to block 104 to provide an error signal on line 106 as the second input to the summing junction 90. The speed loop control 104 will be discussed in more detail below in conjunction with FIG. 4.

The output of the summer 90 on a line 108 represents a pressure set point which is provided to a pressure control loop 110 at a switch network 112. The switch network 112 on an equivalent functional block may select between an external set point signal on a line 114, such as is generated for special start conditions as explained in co-pending application Special Start Technique For a Continuously Variable Transmission Control System, referenced above. The switch network 112 also operates to limit the transmission of the signal from the line 108 for pressure control solely when that signal is greater than or equal to zero as described more fully below. When the signal on line 108 would cause the clutch pressure to drop below the touch off pressure, the signal is blocked in response to the comparison from line 116 so that the clutch pressure remains at the minimum touch off pressure during operation. The touch off pressure is the necessary pressure to bring the clutch plates into contact. Switch function network 112 also serves to add no additional pressure setpoint to the pressure loop control (128), to maintain touch off pressure as in engage and hold modes.

The output signal on the line 118 from the switch 112 provides one input to a summing junction 120. The second input to the summing junction 120 comes from a touch off pressure signal which is that signal necessary to generate the pressure to cause the clutch plates to make initial contact. The final input to the summing junction 120 comes from a transducer which provides a clutch pressure signal as a measure of actual clutch pressure on a line 124. The summing junction 120 generates an error signal on a line 126 which through the pressure loop control 128 provides an output signal on a line 130 to generate a signal having the appropriate duty cycle to operate the clutch valve so as to generate the desired clutch pressure which is then fed back via the closed loop by the line 124. The operation of the pressure loop control 128 is explained below in more detail in conjunction with FIG. 5.

Figure 3A:
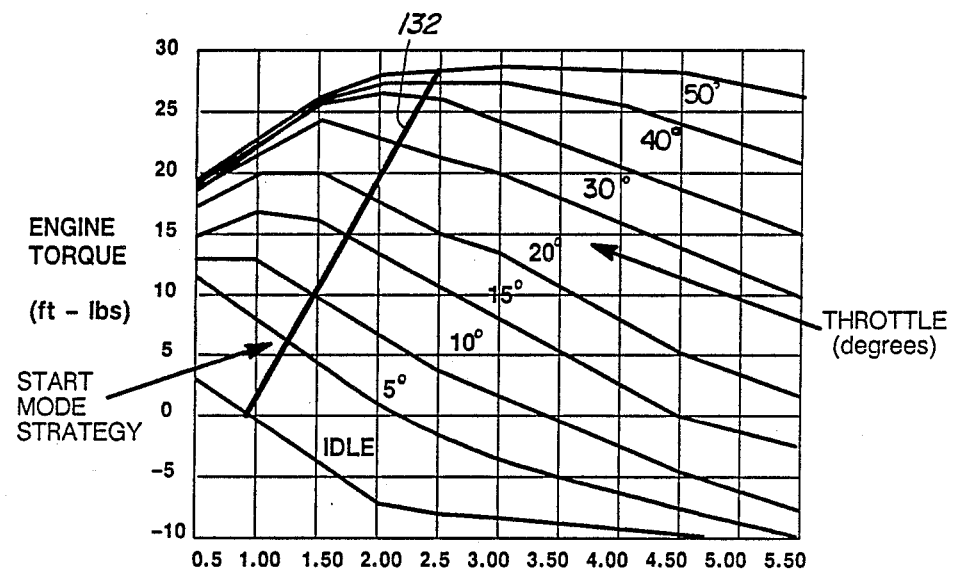
FIG. 3A is an exemplary engine map showing engine torque as a function of engine speed and throttle setting.

Referring now to FIG. 3A, therein is shown a characteristic engine map which plots engine torque in foot-pounds against engine speed in RPMs (×1,000) as a function of the engine throttle setting, which in the preferred embodiment is measured in degrees of the throttle valve. It will be appreciated by those skilled in the art that this mapping illustrated in FIG. 3A varies with particular engines. Based upon various considerations, such as optimization of engine performance, a start mode strategy may be mapped on the engine map of FIG. 3A as illustrated by the line 132 which would represent the selected start mode for bringing the clutch pressure from touch off pressure during the HOLD mode to a clutch pressure which controls the engine speed during START mode, to a lockup in the DRIVE mode for a vehicle.

Figure 3B:
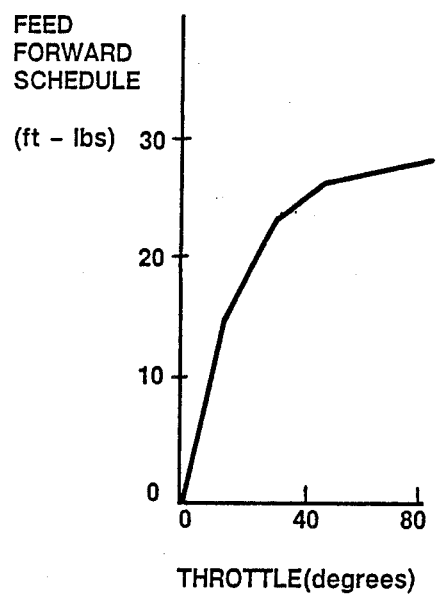
FIG. 3B is a graphic representation of an exemplary engine torque schedule as a function of throttle setting derived from the engine map of FIG. 3A.

Once the START mode strategy, such as that illustrated by the graph 132 in FIG. 3A, has been determined, a schedule of engine torque may be plotted against driver demand measured by throttle as illustrated by the graph of FIG. 3B. This graph is generated from that of FIG. 3A by picking off the corresponding engine torque values for successive throttle settings. This schedule may then be used to generate the signal on the line 72 of FIG. 2 as a function of the throttle setting received on the input line 62 of FIG. 2.

Figure 3C:
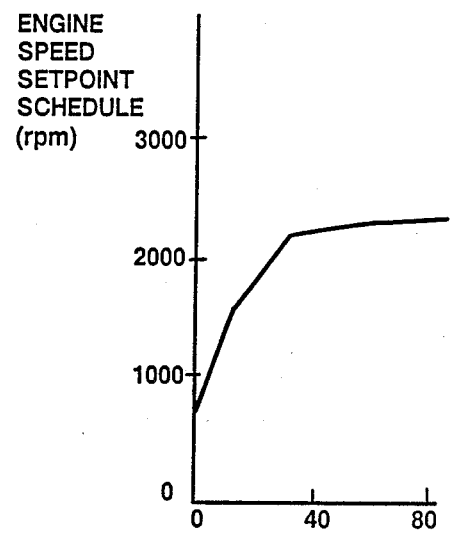
FIG. 3C is a graphic representation of exemplary engine speed schedule as a function of throttle setting derived from the engine map of FIG. 3A.

A corresponding graph of desired engine speed set point may be generated as a function of throttle as illustrated in FIG. 3C. Again, this graph represents a pick off of corresponding engine speed points for particular throttle settings corresponding to the graph line 132 of FIG. 3A. This schedule then provides an engine speed set point schedule to provide an engine speed set point on a line 74 as a result of the input throttle signal on the input line 62.

It will be appreciated that the engine speed schedule and the feed forward (torque) schedule are interrelated and one may be generated from the other with reference to the original engine map illustrated in FIG. 3A.

Previous applications have described the use of a CVT control system which utilizes the open loop feed forward torque signal from loop 64 in conjunction with the closed loop engine speed control signal from the control loop 68 to provide a desired clutch pressure setting.

The first order filter 74 is included in the open loop torque control 64 to provide for a realistic feel and response to the driver. Upon initial driver demand, absent the first order filter 74, a net positive step signal would be provided to the summing junction 90 which would provide an immediate jump in the pressure to the clutch and hence cause the vehicle to jolt or lurch in the drive direction. This can stall the engine and is generally unsatisfactory. Setting the initial condition on the line 76 to the filter 74 provides a zero starting point so that the initial signal on line 98 to the summing junction 90 will always be zero. The first order filter 74 provides an exponential increase in the output signal in response to a dramatic increase, such as a step demand, in the signal on the input line 72. The time constant of the filter 74 may be then empirically chosen to provide the desired realistic response rather than the jolt which would otherwise occur.

Correspondingly, the first order filter 92 is the closed engine speed control loop 68 provides for the slowing of the response to rapid changes in driver demand. Specifically, a rapid rise in throttle corresponding to the driver stepping into the throttle rapidly would normally provide a quick jump in the engine speed set point on the line 74 which would provide a significant error signal at the output of the sum junction 98 and a corresponding decrease in the signal on line 106 to the second summing junction 90 which would generate a lull or a quick sag in the pressure set point signal and a lessening of the pressure at the clutch. This would cause the vehicle to seem to hesitate in response to the stepping hard on the accelerator by the driver. This condition is unsatisfactory. The inclusion of the first order filter 92 slows the response to the driver demand as a function of the characteristics chosen for that filter as explained above. These values may be chosen empirically to provide the desired feel depending on the particular engine and vehicle being utilized. The initial condition received by the filter 92 on the line 94 is chosen to provide a zero error signal at the beginning of start mode. This is done by choosing the initial condition on the line 94 to be a filtered actual engine speed measure. Hence, there would be no difference signal at the output of the summing junction 98. Then, as time elapses, the signal on the line 106 would gradually come to the appropriate value. In this fashion, the hesitation associated with a rapid increase in throttle demand may be avoided.

It will be appreciated by those skilled in the art that the same conditions which lead to a lull or slip in the clutch upon a rapid driver demand would cause a surge upon a rapid decrease in driver demand. That is, when the driver lets up on the throttle quickly, the engine speed set point would drop below the actual engine speed to provide a net positive signal to the summing junction 90 and hence an increase in the pressure set point signal on the line 108 with the result in a rapid increase in the pressure at the clutch and a surge felt by the driver. Again, the first order filter 92 softens this response as a function of its time constant which may be empirically determined to provide the desired feel for the driver as a match between the engine and the vehicle. Also, the filtered speed signal as an initial condition on the line 94 which guarantees that a net zero error signal will occur at the time of each entrance into start mode.

Figure 4:
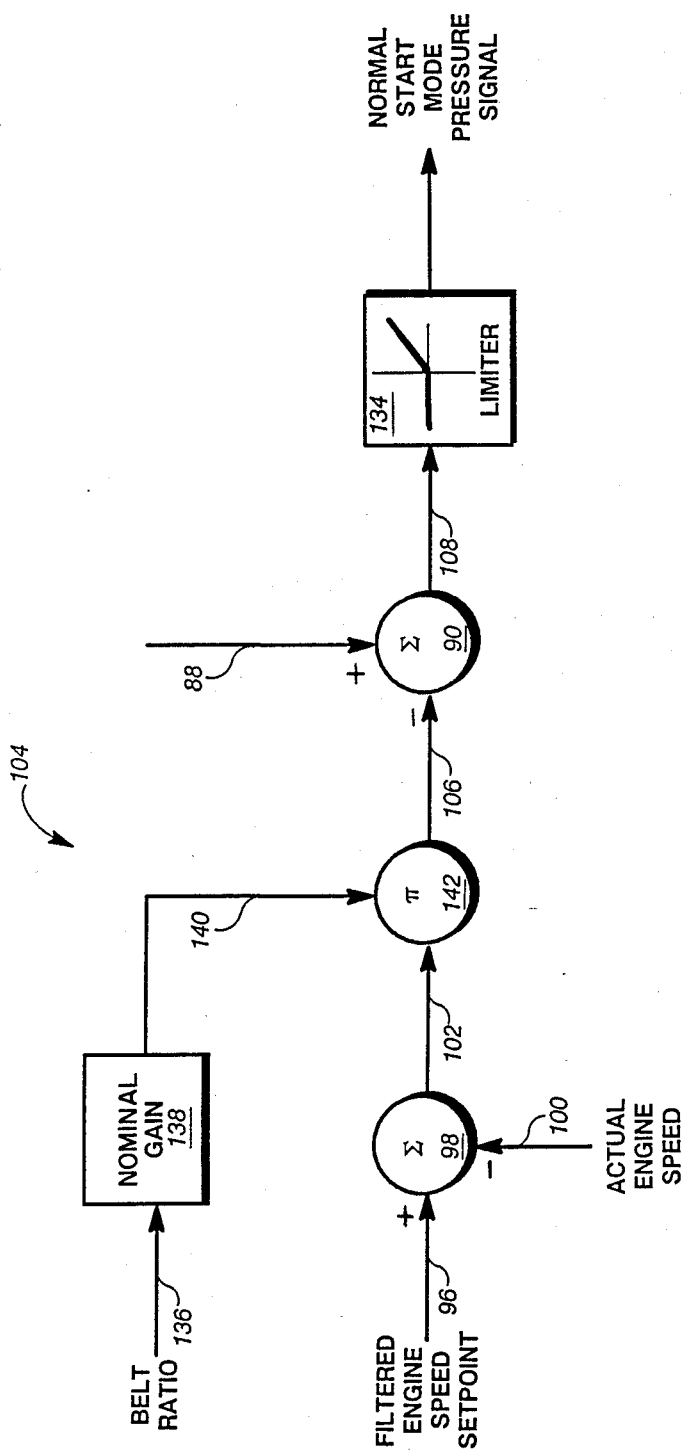
FIG. 4 is a block diagram representation of the engine speed loop control illustrated in FIG. 2.

Referring now to FIG. 4, there is shown a block logic representation for the speed loop control 104 of FIG. 2. Generally, the engine speed set point on a line 96 is combined with actual engine speed from a line 100 at a summation junction 98 to provide a first error signal on a line 102. A speed loop control circuit or operation 104 modifies the signal on line 102 to provide a second error signal on a line 106 which is combined at the summing junction 90 with the feed forward torque generated signal on line 88. This provides a normal start pressure signal on a line 108 which is monitored by a limiter function 134 to ensure that at least touch off pressure is maintained at the clutch.

The speed loop control circuit 104 is shown in greater detail in FIG. 4. A belt ratio signal on a line 136 is multiplied by a nominal gain at block 138 to provide a modified gain signal on a line 140 to provide the multiplier at an operation block 142. This provides a gain in the engine speed control loop 68. As seen, this is a function of the belt ratio and hence provides a constant response of the control for all belt ratios. The operation of the speed loop control function is governed by the following equations (9), (10) and (11):

$$KASC = RATC \times KASCN \qquad (9)$$

$$E1SC = NESPCF - NE \qquad (10)$$

$$E2SC = KASC \times E1SC \qquad (11)$$

where:
KASCN = nominal speed loop gain (gain at block 138)
RATC = belt ratio (signal on line 136)
KASC = speed loop proprotional gain (signal on line 140)
E1SC = speed loop error (signal on line 102)
E2SC = speed loop pressure set point (signal on line 104)
NE = actual engine speed (signal on line 100).

The signal on the line 106 is combined with the feed forward signal on line 88 to provide an output signal on the line 108 representing the normal start mode pressure setpoint. This signal is given generally by the following equation (12):

$$PPC = \begin{cases} PCLUN - E2SC \\ 0.0 \end{cases} \qquad (12)$$

where:
PCC(n) = normal start mode pressure setpoint.

The limiter block 134 previously shown as being a function of switch 112, generally illustrates the two state nature of the signal PCC (the setpoint at line 108). This ensures that the signal on the line 118 to the summing junction 120 will never have a negative value to cause the output signal from the pressure loop control on the line 130 to drop below the touch off pressure and cause the plates of the clutch to pull apart during start mode operation.

Figure 5:
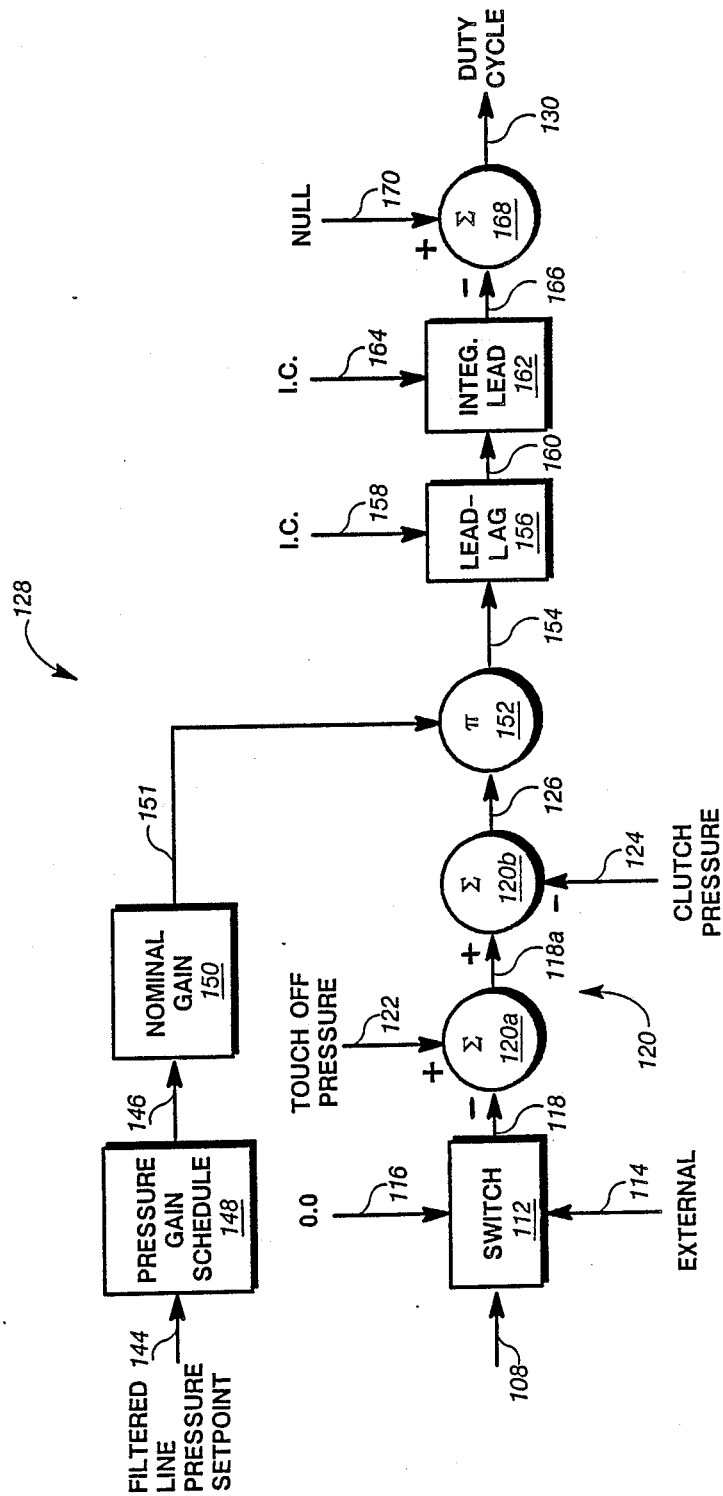
FIG. 5 is a block diagram representation of the pressure loop control illustrated in FIG. 2.

Referring now to FIG. 5, therein is shown a pressure loop control in block diagram form. As in FIG. 2, the pressure loop control function 128 receives a pressure error signal at line 126 as a function of the feedback clutch pressure on line 124 and the incoming normal start mode set pressure signal at line 108 and the touch off pressure setpoint on line 122. In FIG. 5, the summation function 120 is shown as a first summation block 120a and second summation block 120b. In all other respects, that portion of the block diagram of FIG. 5 is equivalent to that of FIG. 2.

Figure 6:
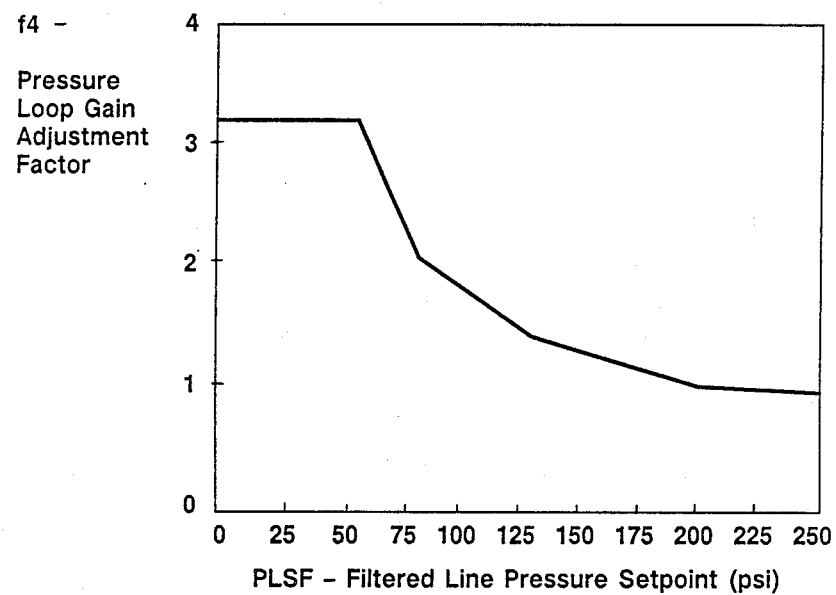
FIG. 6 is a graphic representation of desired pressure loop gain adjustment as a function of the line pressure set point to provide the input information reference in FIG. 5.

The pressure loop control function 128 is shown in greater detail in FIG. 5. The filtered line pressure setpoint at line 144 determines a pressure loop gain adjustment factor at a line 146 as a function of the pressure gain schedule 148 as shown in FIG. 6. In start mode, the line pressure control is operated in an open loop scheduled mode since the CVT design does not have the benefit of a pressure transducer to measure the actual line pressure. This is shown in detail in copending application entitled "Control System For Controlling The Line Pressure In A Continuously Variable Transmission", Ser. No. 936,527. Therefore, the line pressure setpoint is filtered to approximate the actual line pressure and it is this signal that is used to adjust the clutch pressure loop gain. The pressure loop gain adjustment factor at line 146 operates on a nominal gain at block 150 to provide the multiplying factor for the gain of the pressure loop at a multiplier block 152. The product of the multiplying gain from the line 151 times the error signal on the line 126 at the multiplier block 152 results in a pressure error signal on a line 154.

The operation of the summing circuit 120 may generally be explained by the following equations (13) and (14):

$$PCLUSP = PCC + PCE \quad (13)$$

$$E1PC = PCLUSP - PCL \quad (14)$$

where:
PCC = normal start mode set pressure (line 118)
PCE = clutch touch-off pressure (line 122)
PCLUSP = clutch pressure set point (line 118a)
PCL = actual clutch pressure (line 124)
E1PC = pressure error (line 126).

The operation resulting in the proportional gain factor at line 151 may generally be explained by the following equation (15):

$$KAPC = KAPCN \times f4(PLSF) \quad (15)$$

where:
PLSF = filtered line pressure set point (line 144)
f4 = gain function (block 148)
KAPCN = nominal pressure loop proportional gain (block 150)
KAPC = pressure loop proportional gain (line 151).

The operation of the multiplier block 152 may generally be given by the following equation (16):

$$E2PC = KAPC \times E1PC \quad (16)$$

where:
E2PC = proportional gain term output (line 154).
E1PC = clutch pressure error signal (line 126).

For further optimization of the response of the clutch pressure control loop, and for increased stability in the pressure control loop, a lead lag compensation may be performed upon the pressure error signal at line 154. This is represented generally by a block 156 responsive to the signal at line 154 and an initial condition imposed at line 158. Generally, the operation of the lead lag function at block 156 may be given by the following formulation (17):

$$E3PC = \frac{S/\omega lead + 1}{S/\omega lag + 1} E2PC \quad (17)$$

where E3PC is the signal at line 160. This function serves to provide a dynamic modification or compensation which gives a better bandwidth, faster response, and retains system stability for the pressure loop control. The lead "zero" value in the numerator of equation 17 may be chosen to provide compensation for the lag induced by the control valve dynamics. In contrast, the lag "pole" in the denominator of equation 17 may be given a sufficiently large value so as not to figure in the practical result.

The discrete form of the compensation is given by:

$$E3PC(n) = CPD - C[E2PC(n) - X1PDC(n)] + X1PDC(n) \quad (18)$$

$$X1PDC(n+1) = -BPDC[E2PC(n) - X1PDC(n)] + E2PDC(n) \quad (19)$$

where:
E3PC = output of lead/lag (line 160)
Tsp = sample period of pressure loop
CPDC = ωplag/ωplead
BPDC = exp(−ωplag*Tsp)
X1PDC = lead/lag state variable.

To ensure that the steady state error in the pressure loop will be equal to zero, an integral-lead function is inserted at a block 162. In response to the pressure error signal at line 160 and an initial condition at line 164, the integral-lead function 162 provides a control signal at line 166. It will be appreciated by those skilled in the art that any signal at the line 160 other than zero will provide a ramp output at line 166 proportional to that signal which through operation of the feedback control would tend to provide a correction error signal to bring the system back toward a zero, steady state error signal. The lead function in the integral is introduced to compensate for the lag of the hydraulics. Generally, the integral lead operation of block 162 may be given by the following equation (20):

$$E4PC = \frac{S(\omega ilead) + 1}{S} E3PC \quad (20)$$

where E4PC is a signal at line 156. The integrator is limited so that saturation of its digital implementation will not saturate the input to the PWM generator. The discrete form of this compensation is given by:

$$E4PC(n) = X2PIC(n) + E3PC(n) \quad (21)$$

$$X2PIC(n + 1) = X2PIC(n) + DPIC \times E3PC(n) \quad (22)$$

-continued $$X2PIC(n) = \begin{cases} X2LPIC, & X2PIC(n) < X2LPIC \\ X2PIC(n), & X2LIPC < X2PIC(n) < X2UPIC \\ X2UPIC, & X2PUC(n) > X2UPIC \end{cases} \quad (23)$$

where:
E4PC(n)=output of integral-lead term
DPIC=ωilead*Tsp
X2PIC=state variable of integrator/lead
X2LPIC=lower limit of integrator
X2UPIC=upper limit of integrator.

The signal at line 166 may then be combined at a summation junction 168 with a null signal from a line 170. The null signal at line 170 represents a steady state error which corresponds to the clutch control valve in use. This serves to further ensure that the steady state zero value will be achieved to provide the desired duty cycle signal as an output of the line 130.

Generally, the operation at the summation junction 168 may be given by the following equation (24):

$$E5PC(n) = NPC - E4PC(n) \quad (24)$$

where:
E5PC(n)=control signal to determine duty cycle (line 130)
NPC=null for valve (line 170).

Referring now to FIG. 6, therein is shown a typical pressure loop gain schedule which illustrates the pressure loop gain adjustment factor on a vertical scale as a function of the filtered line pressure setpoint in pounds-per-square-inch (psi). The incorporation of this schedule into the pressure loop control at block 148 of FIG. 5 further facilitates the accurate response of the clutch pressure control loop by incorporating a value dependent upon the filtered line pressure setpoint. This maintains a constant open loop gain for all values of the given line pressure. The schedule of FIG. 6 represents an empirical tabulation which may be performed for particular systems in which the control of the present invention may be utilized.

Figure 7A:
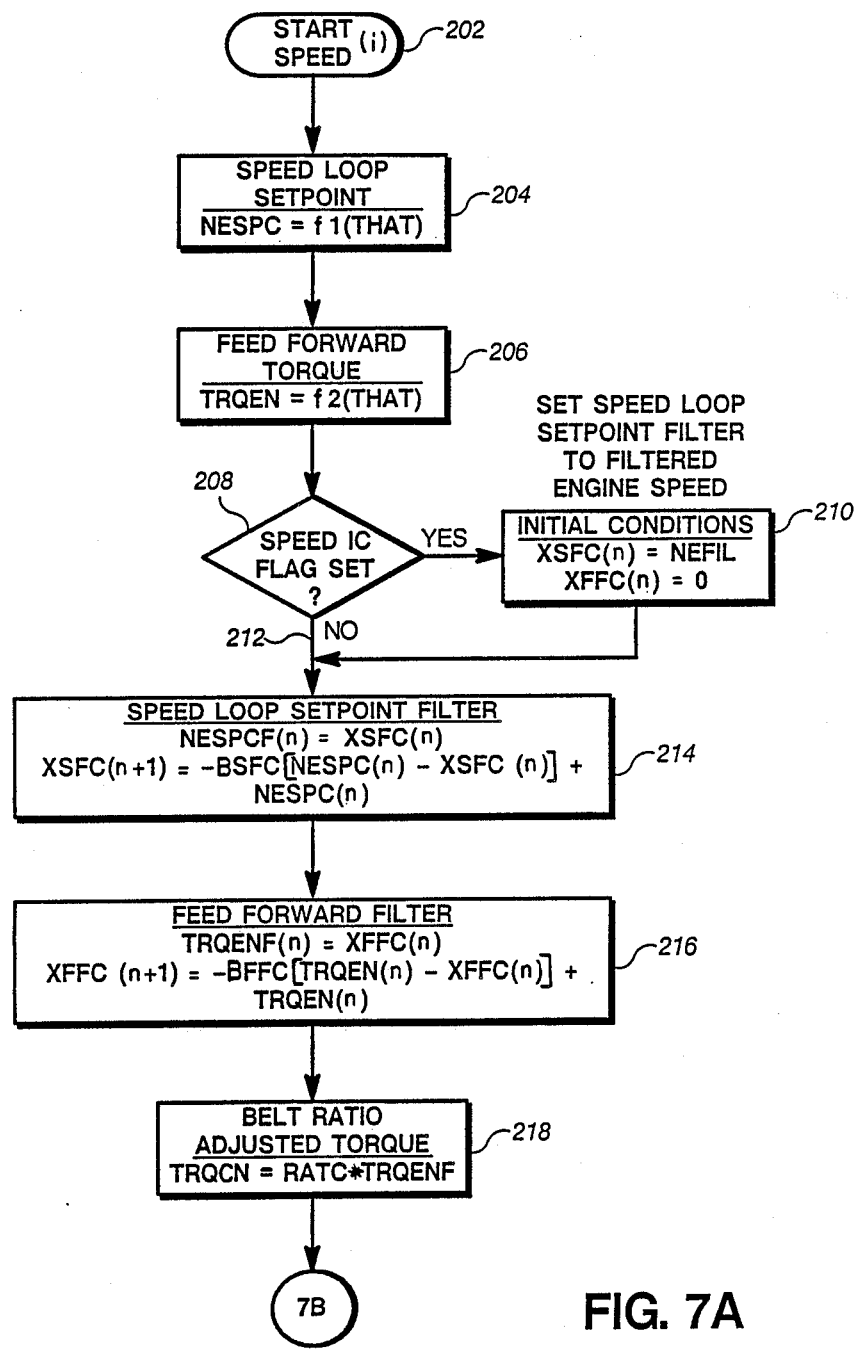
FIGS. 7A and FIG. 7B combined illustrate a flow chart representation of the algorithm utilized to provide the desired pressure setting to the pressure loop control of FIG. 2 for normal start mode.
Figure 7B:
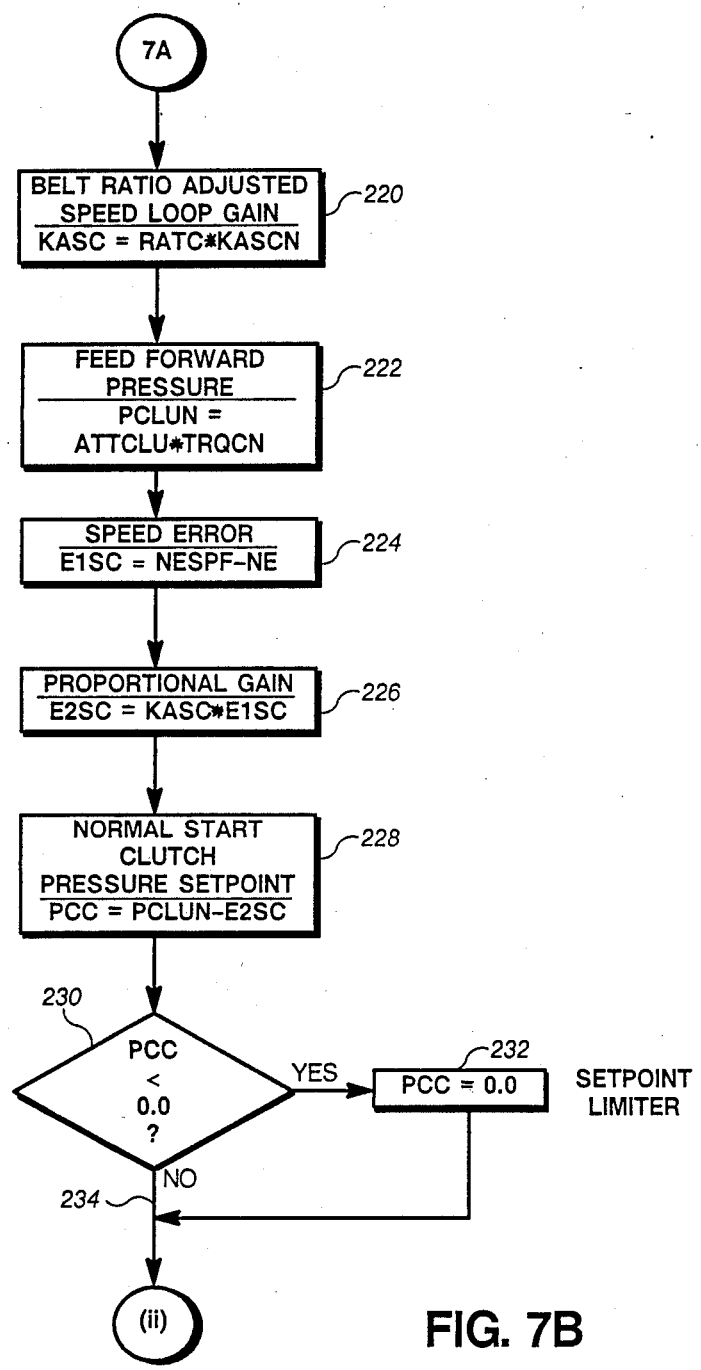

Referring now to FIGS. 7A and 7B, therein is shown a flow chart representation of the functions for the speed loop control as set forth above. Proceeding from speed start block 202, a speed loop setpoint is determined at block 204 as a function of throttle from the engine speed schedule. Correspondingly, a feed forward torque is determined at a block 206 which is a second function of the throttle. This represents the interrelation between the throttle, engine speed and engine torque. At decision block 208, the system determines whether the speed initial flag has been set. If YES, then initial condition is set for the first order filter 92 at the filtered engine speed and for the filter 74 at zero as shown by block 210. The system then branches back at line 212. If the speed initial condition flag is not set, then the system advances to line 212 without setting the initial conditions. The system then performs the filter 92 functions at block 214 and proceeds to the filter 74 functions at block 216. At block 218, the system generates the feed forward torque signal adjusted by the belt ratio.

Referring now to FIG. 7B, the belt ratio is incorporated in the speed loop gain at a block 220. Block 222 represents a calculation of the feed forward pressure as a function of the product of the inverse clutch gain times the clutch torque signal. A block 224 represents the speed error calculation, which is then modified at block 226 by the proportional gain generator from the speed loop control 104. A normal start mode clutch pressure setpoint may then be determined at a block 228 as a function of the difference between the feed forward pressure and the speed error signal from the block 222 and the proportional gain block 226, respectively.

A decision block 230 represents the determination of whether the normal start mode clutch pressure set point is less than zero. If it is, then a block 232 represents a setpoint limiter which comes into play to guarantee that the clutch does not fall below the threshold touch-off value during normal start mode. If the pressure setpoint signal is greater than zero, then the system advances at line 234 to the pressure loop control.

Figure 8A:
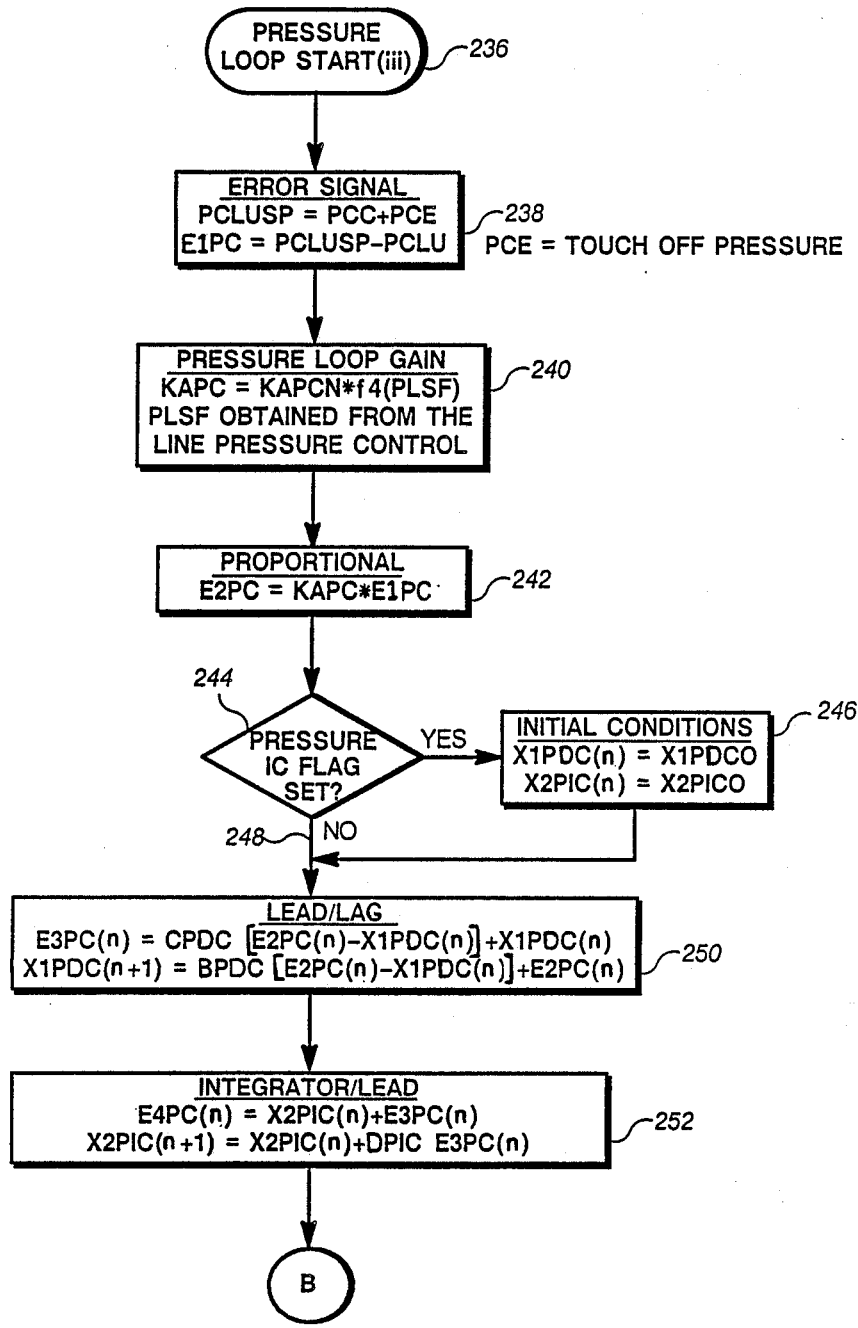
FIGS. 8A and FIG. 8B combined illustrate a flow chart representation of the steps performed in the pressure control loop to provide the desired pressure control pulse width modulated signal for controlling the clutch valve in the CVT.
Figure 8B:
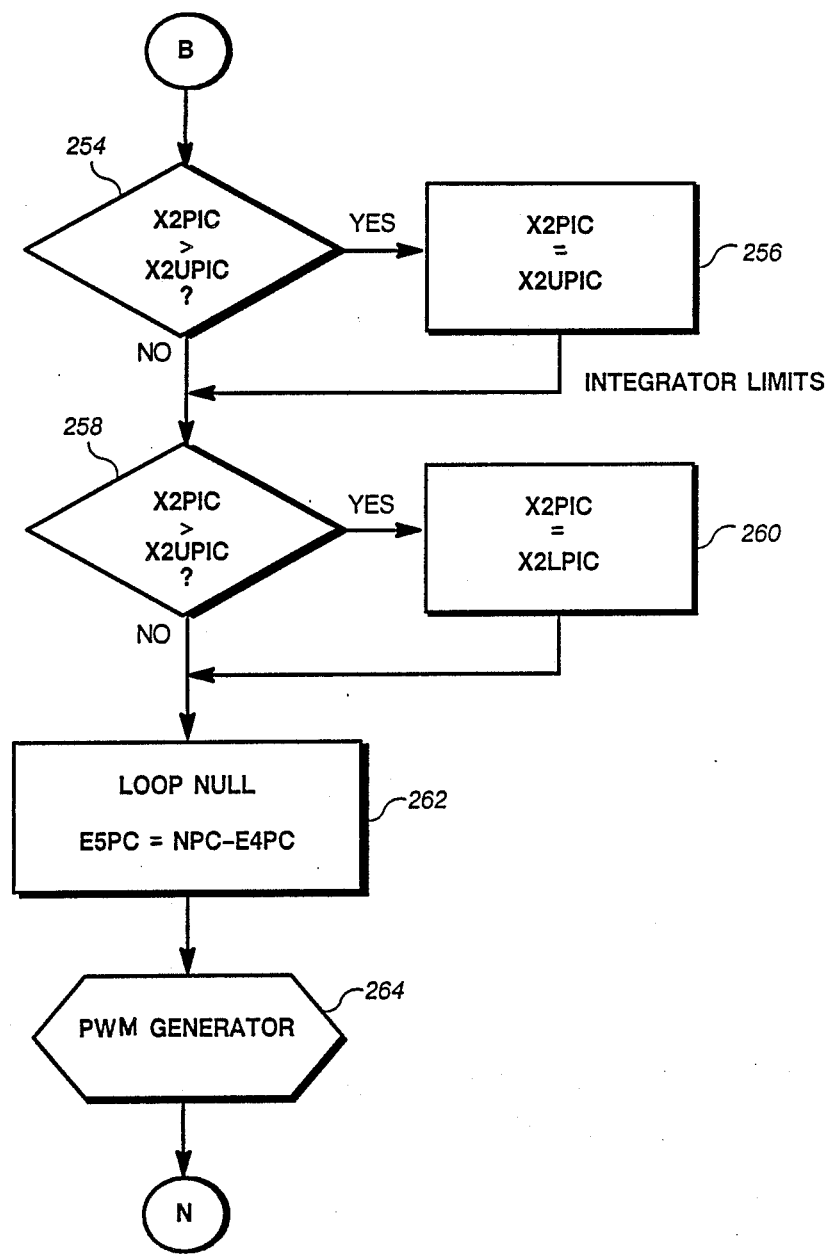

Referring now to FIGS. 8A and 8B, therein is shown the flow chart for the pressure loop control 110 of FIG. 2. At a pressure loop start block 236, the system proceeds to provide an error signal at a block 238 which is a function of the fedback actual clutch pressure, the pressure setpoint signal and the touch-off pressure setpoint. A block 240 represents the calculation of the pressure loop gain as a function of the filtered line pressure setpoint which may be obtained from a look-up table such as that illustrated in FIG. 6. This value at a block 242 provides a proportional gain to the error signal from the block 238. At a decision block 234, the system determines whether the pressure initial condition flag has been set. If YES it branches to block 246 to set initial conditions for lead/lag function 156 in the integrator lead function 162 and then branches back at a line 248. If the pressure initial conditions flag is not set, then the system simply advances to the line 248. A lead/lag function, as explained above, is performed at a block 250 followed by an integrator lead function at a block 252. The lead/lag block 250 compensates in a dynamic sense for the lag introduced by the control valve and provides for improved response in the pressure control loop. The integrator lead block 252 serves to ensure that the steady state error value is zero. Its associated lead term compensates for the lag induced in the system by the hydraulics.

Referring now to FIG. 8B, in operation the integrator lead function 162 must be limited so that the saturation of its digital implementation will not saturate the input to the pulse width modulation generator from the duty cycle signal at the line 130. Hence, the output of the integrator must be compared with the upper and lower limits for the integrator. A decision block 254 compares the output of the integrator with its upper limit. If it is greater than its upper limit, then the value is set at the upper limit at a block 256 and the system branches back. At a decision block 258, the output of the integrator is compared with its lower value. If it is less than its lower value, then the output is set at that lower value at a block 260 and the system branches back.

At a block 262 the system performs the loop null function to compensate for the valve in the system and then branches to the pulse width modulation generator at 264 for generation of the appropriate duty cycle signal to control the clutch pressure valve.

Figure 9A:
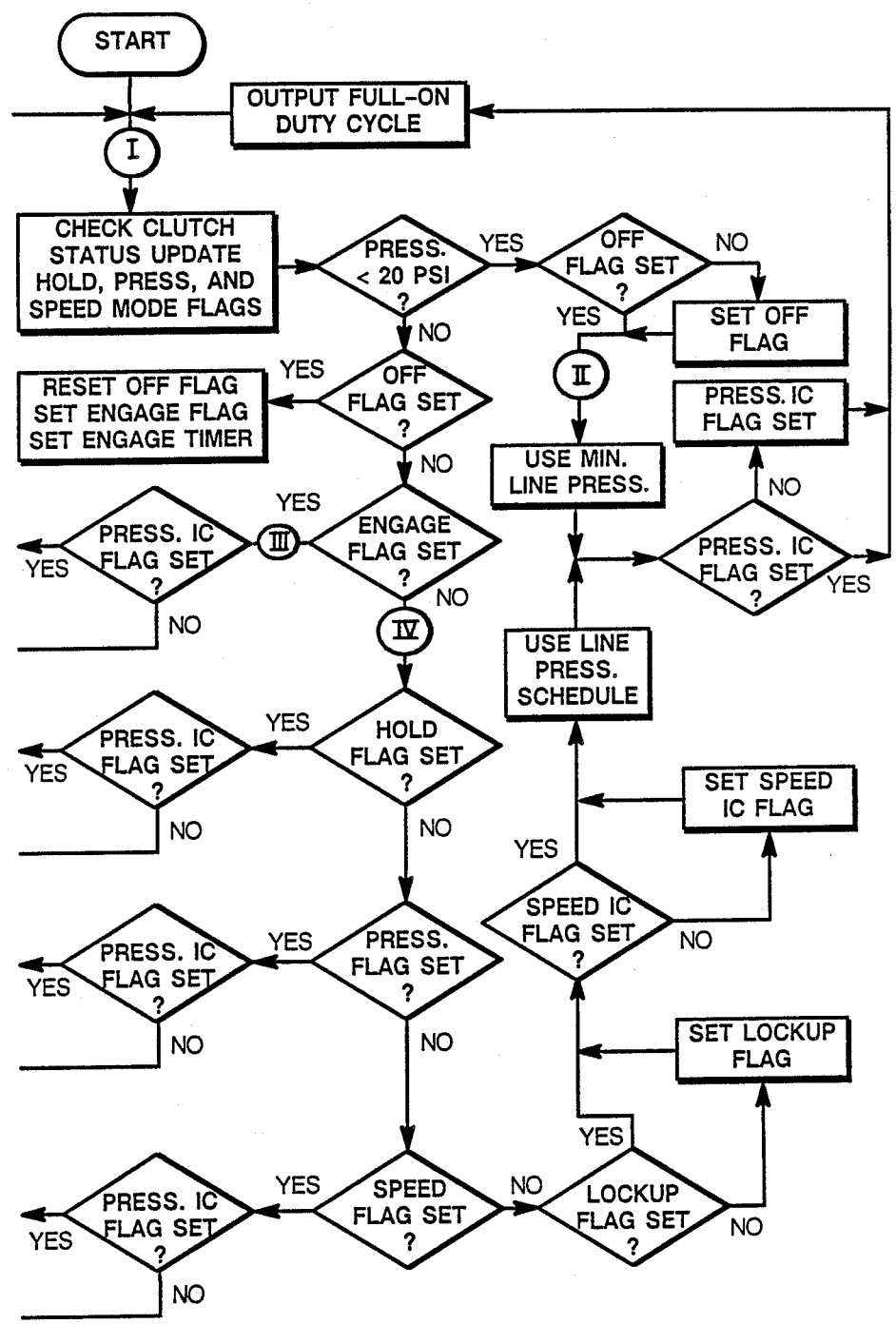
FIGS. 9A and FIG. 9B combined illustrate a logic flow chart representation of the overall logic for the clutch control system and a possible modification thereof.
Figure 9A:
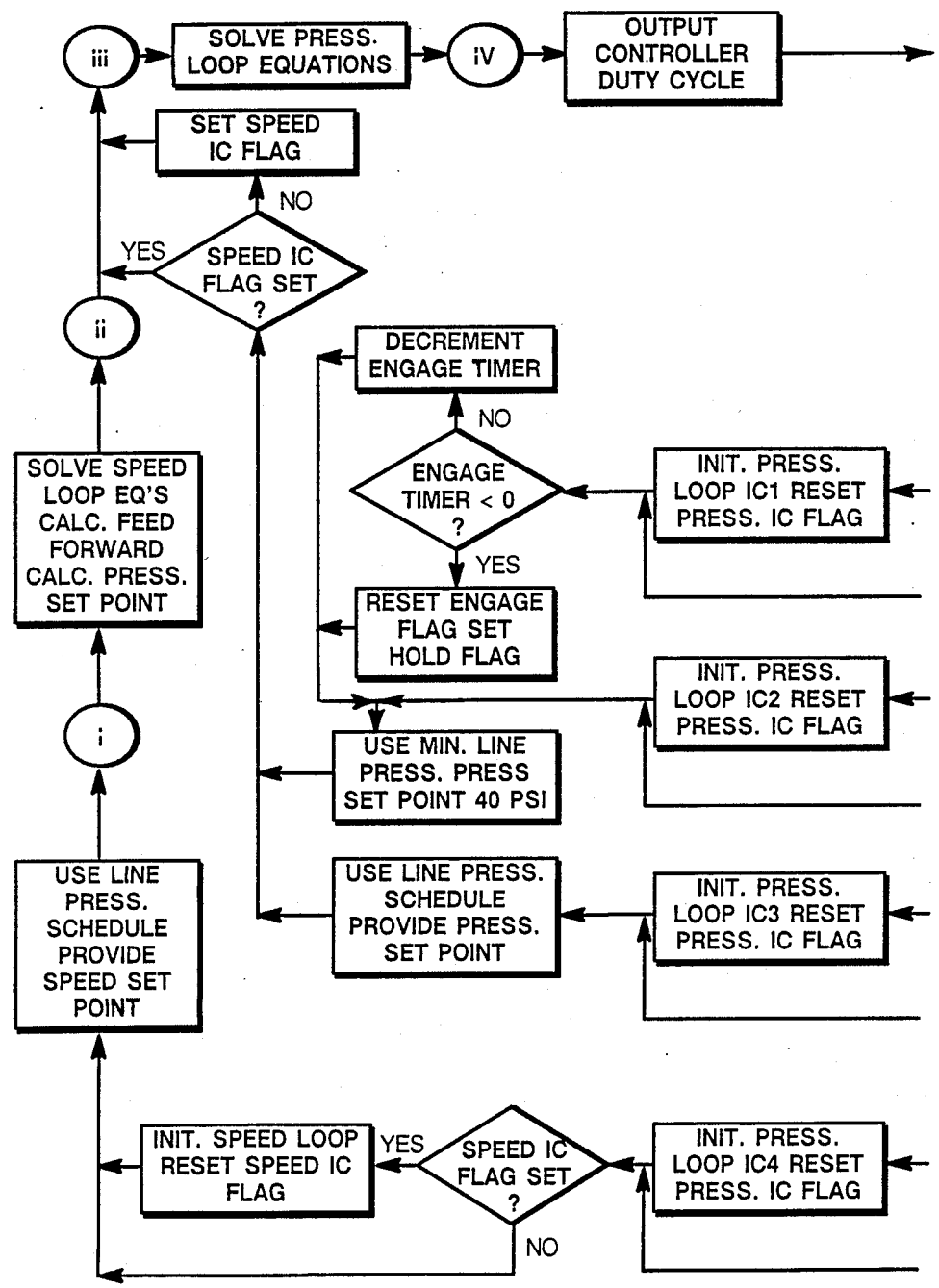
Figure 9B:
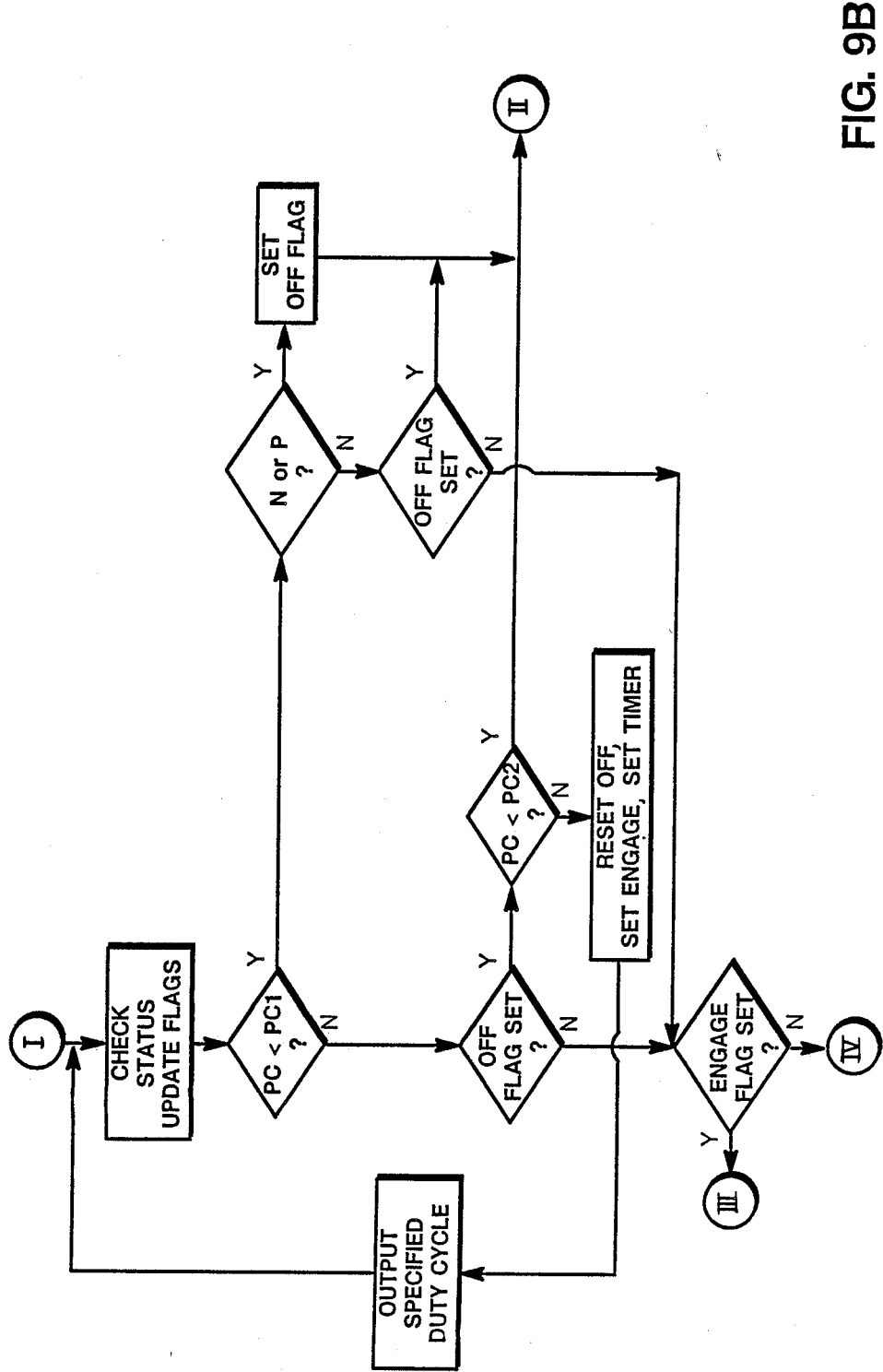

Referring now to FIGS. 9A and 9B, therein is shown the general logic flow chart for the operation of the entire CVT clutch control system which is similar to that described in the previous application in U.S. Pat. No. 4,648,496, entitled "Clutch Control System for Continuously Variable Transmission." FIG. 9B represents an alternative embodiment for the portion of the flow chart of FIG. 9A bounded by I, II, III and IV.

The logic flow charts of FIGS. 7A, 7B, 8A and 8B represent the steps illustrated at the left of FIG. 9A and indicated by the identification i, ii, iii and iv. The corresponding indications have been placed on the flow charts of FIGS. 7A, 7B, 8A and 8B. A further description of the operation of the main logic at this time is deemed unnecessary in view of the incorporation of the description from the previous application.

Temperature compensation may be provided in the preferred embodiment by reference to a copending application entitled "Temperature Compensation Technique For A Continuously Variable Transmission System," Ser. No. 25,392, file on an even date herewith. Likewise, pulse width modulation in the preferred embodiment may be accomplished as taught in a copending application entitled "Pulse Width Modulation Technique," Ser. No. 25,477, filed on an even date herewith.

The present invention has been described above in terms of a number of preferred embodiments and the features thereof. Those features which are deemed to be novel are set forth with particularity in the appended claims. Such modifications and alterations as would be apparent to one of ordinary skill in the art and familiar with the teachings of this application are also deemed to fall within the spirit and scope of the present invention. Interconnections between the system of the present invention and other elements for use in a CVT system and specific program instructions based on the accompanying flowcharts are deemed to be within the ordinary skill of the art.

We claim:

1. A clutch control system for use in a continuously variable transmission system for regulating torque transfer upon driver demand from an engine to a drive line mounted in a vehicle and having a fluid-actuated clutch operable to transfer torque to the drive line and having an associated supply line to supply fluid to apply the clutch and discharge fluid to release the clutch controlled by a clutch control valve assembly in said supply line, which system comprises:
   first control means responsive to a driver demand signal to provide a first control signal representative of a preselected engine torque;
   second control means responsive to said driver demand signal to provide a second control signal representative of a preselected engine speed;
   first filter means in said first control means to provide a modified first control signal;
   second filter means in said second control means to provide a modified second control signal; and
   third control means responsive to said first and second modified control signals to regulate said clutch control valve.

2. A method for providing a clutch control signal in a continuously variable transmission system for regulating torque transfer upon driver demand from an engine to a drive line mounted in a vehicle to a fluid-actuated clutch operable to transfer torque to the drive line and having an associated supply line to supply fluid to apply the clutch and discharge fluid to release the clutch controlled by a clutch control valve assembly in said supply line including:
   sensing a driver demand;
   developing a representative engine torque signal in response to said driver demand;
   developing a representative engine speed signal in response to said driver demand;
   filtering said representative engine speed and said engine torque signals to limit rapid fluctuations in said signals;
   modifying said filtered representative torque signal to provide a first representative pressure signal;
   comparing said filtered representative engine speed signal with an actual speed signal to generate a speed error signal;
   modifying said speed error signal to provide a second representative pressure signal; and
   combining said first and second representative pressure signals to provide a control pressure signal to said clutch control valve.

3. The method of claim 2 further including:
   monitoring said combined pressure control signal; and
   switching said combined pressure control signal to a preselected minimum value whenever said combined signal is less than said preselected minimum value.

4. The method of claim 2 further including:
   sensing system initiation conditions; and
   providing preselected initial condition parameters for said filtering.

5. The method of claim 2 wherein said step of providing comprises:
   providing an actual engine speed representation signal for filtering said representative engine speed signal; and
   providing a zero condition for filtering said engine torque signal.

6. The method of claim 2 wherein said step of modifying said speed error signal comprises:
   sensing the transmission belt ratio;
   selecting a nominal gain factor;
   adjusting said nominal gain factor as a function of said sensed belt ratio; and
   multiplying said speed error signal by said adjusted nominal gain factor to provide a second representative pressure signal.

7. A method for facilitating clutch control in a continuously variable transmission system, having at least a fluid-actuated clutch with an associated supply line to supply fluid to apply the clutch and discharge fluid to release the clutch, including:
   generating a clutch pressure set point;
   comparing said clutch pressure set point with a signal representative of sensed actual clutch pressure to provide a clutch pressure error signal;
   selecting a nominal pressure gain factor; and
   adjusting said nominal pressure gain factor based on variations in the pressure of said associated supply line.

* * * * *